United States Patent
Dupuis et al.

(10) Patent No.: US 11,909,908 B2
(45) Date of Patent: Feb. 20, 2024

(54) METHOD AND APPARATUS FOR MONITORING A COMMUNICATION LINE

(71) Applicant: Nokia Solutions and Networks Oy, Espoo (FI)

(72) Inventors: Nicolas Dupuis, Chaudfontaine (BE); Gert-Jan Stockman, Ronse (BE); Philippe Dierickx, Saint Gery (BE); Paschalis Tsiaflakis, Schriek (BE)

(73) Assignee: Nokia Solutions and Networks Oy, Espoo (FI)

( * ) Notice: Subject to any disclaimer, the term of this patent is extended or adjusted under 35 U.S.C. 154(b) by 510 days.

(21) Appl. No.: 17/142,377

(22) Filed: Jan. 6, 2021

(65) Prior Publication Data
US 2021/0250062 A1    Aug. 12, 2021

(30) Foreign Application Priority Data

Feb. 7, 2020 (EP) .................................. 20156206

(51) Int. Cl.
*H04M 3/30* (2006.01)
*H04M 1/24* (2006.01)
(Continued)

(52) U.S. Cl.
CPC .............. *H04M 3/306* (2013.01); *H04B 3/23* (2013.01); *H04B 3/493* (2015.01); *H04M 1/24* (2013.01);
(Continued)

(58) Field of Classification Search
None
See application file for complete search history.

(56) References Cited

U.S. PATENT DOCUMENTS 6,058,162 A * 5/2000 Nelson .................... H04M 1/24
                                                         379/27.01
6,687,336 B1   2/2004 Holeys
(Continued)

FOREIGN PATENT DOCUMENTS

EP    2464088 A1    6/2012
EP    3331198 A1    6/2018
(Continued)

OTHER PUBLICATIONS

"Single-ended line testing for digital subscriber lines", Series G: Transmission Systems and Media, Digital Systems And Networks Digital sections and digital line system—Metallic access networks, Recommendation ITU-T G.996.2, Nov. 2018, 60 pages.

(Continued)

*Primary Examiner* — Quoc D Tran
(74) *Attorney, Agent, or Firm* — Harness, Dickey & Pierce, P.L.C.

(57) ABSTRACT

Embodiments relate to an apparatus comprising means configured for:
  obtaining echo response data representative of the echo response of a communication line, wherein the echo response data specifies the echo response based on two dimensions and includes first dimension data and second dimension data,
  determining at least one property of the communication line based on processing the echo response data with a neural network, wherein the neural network comprises at least:
    a first convolutional branch for processing the first dimension data,
    a second convolutional branch for processing the second dimension data,
(Continued)

a dense part for processing the outputs of the first and second convolutional branches.

15 Claims, 3 Drawing Sheets

(51) Int. Cl.
| | |
|---|---|
| *H04B 3/493* | (2015.01) |
| *H04M 3/22* | (2006.01) |
| *H04B 3/23* | (2006.01) |
| *G06N 3/008* | (2023.01) |
| *H04B 3/20* | (2006.01) |

(52) U.S. Cl.
CPC .............. *H04M 3/22* (2013.01); *G06N 3/008* (2013.01); *H04B 3/20* (2013.01)

(56) References Cited

U.S. PATENT DOCUMENTS

| | | | |
|---|---|---|---|
| 6,819,744 B1* | 11/2004 | Banwell | H04M 3/002 |
| | | | 379/1.04 |
| 7,027,589 B2* | 4/2006 | Shi | H04M 3/30 |
| | | | 379/345 |
| 8,130,911 B2* | 3/2012 | Borjesson | H04M 3/305 |
| | | | 379/22.01 |
| 9,420,090 B2* | 8/2016 | Mohseni | H04M 3/306 |
| 10,051,117 B2* | 8/2018 | Zahedi | H04B 3/46 |
| 2009/0292948 A1 | 11/2009 | Cinato et al. | |
| 2009/0310755 A1 | 12/2009 | Dinesh et al. | |
| 2011/0058502 A1 | 3/2011 | Feng | |
| 2013/0154664 A1* | 6/2013 | Drooghaag | H04M 3/306 |
| | | | 324/539 |
| 2015/0030059 A1 | 1/2015 | Kalavai | |
| 2015/0085995 A1 | 3/2015 | Mohseni et al. | |
| 2016/0337512 A1 | 11/2016 | Kalavai | |
| 2018/0027113 A1 | 1/2018 | Mohseni et al. | |

FOREIGN PATENT DOCUMENTS

| | | |
|---|---|---|
| EP | 3528432 A1 | 8/2019 |
| EP | 3562047 A1 | 10/2019 |
| WO | 2019/042998 A1 | 3/2019 |

OTHER PUBLICATIONS

Boets et al., "Single-Ended Line Testing—A White Box Approach", Proceedings of the 4th LASTED International Multi-Conference Wireless and Optical Communications, Jul. 8-10, 2004, pp. 393-398.

Neus et al., "Feature Extraction of One Port Scattering Parameters for Single Ended Line Testing", XVIII Imeko World Congress, Metrology for a Sustainable Development, Sep. 17-22, 2006, 6 pages.

Li et al., "Real-time Faulted Line Localization and PMU Placement in Power Systems Through Convolutional Neural Networks", arXiv, May 17, 2019, pp. 1-11.

Marnerides et al., "Fault Diagnosis in DSL Networks Using Support Vector Machines", Computer Communications, vol. 62, May 15, 2015, pp. 72-84.

Extended European Search Report received for corresponding European Patent Application No. 20156206.3, dated Jul. 20, 2020, 6 pages.

* cited by examiner

METHOD AND APPARATUS FOR MONITORING A COMMUNICATION LINE

FIELD OF THE INVENTION

Embodiments of the invention relate to the field of telecommunication. In particular, embodiments of the invention relate to a method and apparatus for monitoring a communication line.

BACKGROUND

The performance of communication lines, for example used with DSL technology, is a key factor for a network operator. Techniques for monitoring a communication line involve taking measurements on a communication line and determining properties of the line based on the measurements. Based on the determined line properties, the network operator can implement technical or business actions. It is therefore desirable to determine the line properties reliably and/or with great accuracy.

An example is SELT (Single Ended Line Testing), as defined in ITU-T G.996.2, which involves measuring electrical characteristics of a digital subscriber line (xDSL) in order to determine certain properties of the line. SELT includes measuring the echo response of a line. It is however not straightforward to derive line properties based on the measured echo response.

SUMMARY

It is thus an object of embodiments of the present invention to propose a method and an apparatus, which do not show the inherent shortcomings of the prior art.

Accordingly, embodiments relate to apparatus comprising means configured for:
  obtaining echo response data representative of the echo response of a communication line, wherein the echo response data specifies the echo response based on two dimensions and includes first dimension data and second dimension data,
  determining at least one property of the communication line based on processing the echo response data with a neural network, wherein the neural network comprises at least:
    a first convolutional branch for processing the first dimension data,
    a second convolutional branch for processing the second dimension data,
    a dense part for processing the outputs of the first and second convolutional branches.

Correlatively, embodiments relate to a computer-implemented method for monitoring a communication line, comprising:
  obtaining echo response data representative of the echo response of a communication line, wherein the echo response data specifies the echo response based on two dimensions and includes first dimension data and second dimension data,
  determining at least one property of the communication line based on processing the echo response data with a neural network, wherein the neural network comprises at least:
    a first convolutional branch for processing the first dimension data,
    a second convolutional branch for processing the second dimension data,
    a dense part for processing the outputs of the first and second convolutional branches.

In some embodiments, the first dimension data comprise magnitude data and the second dimension data comprise phase data.

In some embodiments, obtaining echo response data comprises receiving measurement data wherein the echo response is specified in a complex format comprising real part and imaginary part, and determining the magnitude data and phase data based on the echo response.

In some embodiments, said means are further configured for determining time domain data specifying a time domain reflectogram based on the echo response, wherein the neural network comprises a third convolutional branch for processing the time domain data and wherein the dense part is configured for processing the output of the third convolutional branch.

In some embodiments, the echo response data specifies an uncalibrated echo response, and said means are further configured for determining a calibrated echo response based on the uncalibrated echo response and calibration data.

In some embodiments, said means are further configured for:
  determining at least one other property of the communication line based on processing the echo response data with another neural network, wherein the other neural network comprises at least:
    a fourth convolutional branch for processing first dimension data,
    a fifth convolutional branch for processing the second dimension data,
    another dense part for processing the outputs of the fourth and fifth convolutional branches and said at least one property.

In some embodiments, said at least one property include at least one of a line termination, a line length, a type of a cable, a presence of an impairment, a type of impairment, a location of an impairment.

In some embodiments, said at least one property include the line termination and said at least one other property include the line length.

In some embodiments, said means are further configured for controlling a display based on the determined at least one property and/or configuring a network element associated with the communication line based on the determined at least one property.

In some embodiments, said means are further configured for determining a training set based on generating echo response of modelled communication lines with a circuit simulator, and training the neural network based on the training set.

Said means may comprise at least one processor and at least one memory storing computer program code, the memory and the computer program code being configured to cause, with the processor, the apparatus to operate as mentioned.

Embodiments of the invention relates also to a computer program, for example stored on non-transitory computer readable medium, comprising instructions to cause an apparatus to operate as mentioned.

The scope of protection sought for various embodiments of the invention is set out by the independent claims. The embodiments and features, if any, described in this specification that do not fall under the scope of the independent claims are to be interpreted as examples useful for understanding various embodiments of the invention.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

SELT (Single Ended Line Testing), as defined in ITU-T G.996.2, involves measuring electrical characteristics of a digital subscriber line (xDSL) in order to determine certain properties of the line. As opposed to DELT (Dual Ended Line Testing), SELT tackles the constraint of only conducting measurements at the CO (Central Office), removing the need for measurement equipment at the CP (Customer Premises) and consequently reducing the OPEX (Operating Expenditures) for such tests. Note that, however, the main use case is to execute a SELT from the CO, it's also possible to execute a SELT measurement from the CP in case a CPE or a field technician test-head would able to perform a SELT measurement when connected at the customer end. This would permit to investigate the loop from the other side of the potential cable cut if needed.

The goal of SELT is to obtain a reasonable estimate of different parameters determining the line quality: end-to-end transfer function of the loop, loop topology (topography, line types and line lengths), identification of disturbers at the receiver and cable impairment detection.

This is useful when, for some reason, the DSL service is down (loop cut, binder cut, fault segmentation between home and network, . . . ) or performing poorly (fault location for bad contacts, impedance mismatch, . . . ). SELT can provide the necessary insights for debugging such a problem. Furthermore, it allows mapping network capacity by predicting channel data-rates (in bit/s).

Figure 1:
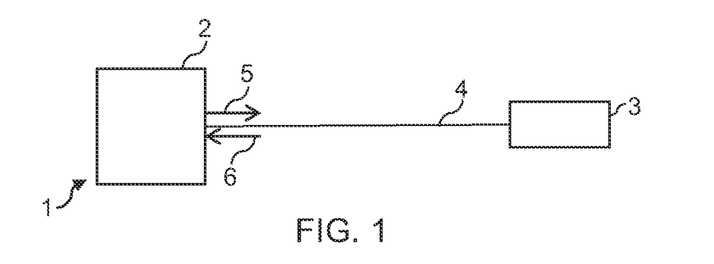
FIG. 1 is a block diagram of a communication system where SELT measurement is performed.

FIG. 1 is a block diagram of a communication system 1 where SELT measurement may be performed. The communication system 1 comprises a network element 2 and a network element 3 which may be connected by a communication line 4.

The network element 2 is for example an access node, for example a DSLAM, located in a network operator's premises (Central Office, Street Cabinet . . . ) and connected to one or more network elements 3 by respective communication lines 4. The network element 3 is for example a modem or CPE located in customer premises.

The communication line 4 may be for example a twisted pair of wires. It is expected that the communication line 4 runs between the network element 2 and the network element 3, but there may be situations where the line starting from the network element 2 does not reach network element 3, for example because the cable is cut.

The network element 2 and network element 3 may be configured for communicating over the communication line 4 based on DSL technology.

In some case, SELT measurement involves the network element 2 sending an excitation signal 5 on the communication line 4 and measuring the received signal 6 on the communication line 4. The echo response of the communication line 4 represents the estimated mean value of the voltage ratio $V(f)/E(f)$, where $E(f)$ is the excitation signal and $V(f)$ the measured signal at frequency f. This is typically referred to as uncalibrated echo response (UER), and calibration techniques allow to covert an UER to a calibrated echo response (CER).

For each impairment or line properties that should be detected, a separate algorithm may be developed by a subject-matter expert (SME) to extract certain 'features' out of the UER or CER curves. Those features can be, amongst others, the number of dips detected, the height of these dips or the average value of the CER in a certain frequency band. Consequently, these features may be fed to a classifier that will combine different features together and, based on a decision rule, and with a certain confidence, will detect the presence or absence of the impairment.

However, extracting relevant patterns/signatures from U/CERs in order to derive the targeted information (loop length, loop termination (open, short, terminated, unknown, etc.), etc.) is not straightforward. Indeed, the available formal knowledge about U/CERs is limited (from the literature or from experts) and the nature of the curves/patterns makes the empirical algorithm design challenging. Indeed, by nature, the type of cable (copper gauge, insulation used, distance between wires, twisting ratio of the pair . . . ), its topology (presence of a connected device at the termination or of a fault—short-cut) influence the CER by producing different patterns. Or, in other words, for the same insight to derive (e.g. loop length), a very different pattern could be present on the U/CERs. And these patterns are influenced by various degrees of freedom.

Moreover, such a solution for Single-Ended Line Testing (SELT-P) may only be available for classical xDSL (ADSLx, VDSL2) technologies, and does not deal with G.(mg) fast spectrum.

Figure 2:
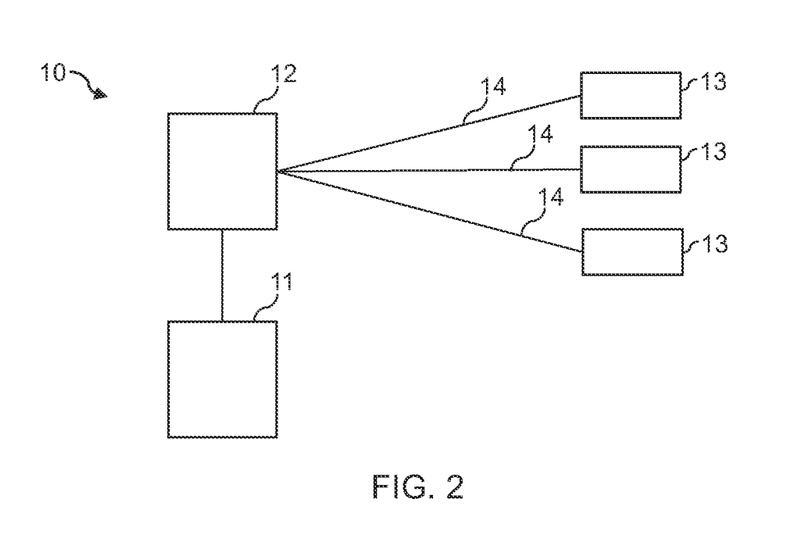
FIG. 2 is a block diagram of a communication network.

FIG. 2 is a block diagram of a communication system 10 where embodiments of the invention may be used. The communication system 10 comprises one or more network elements 12, one or more network element 13, one or more communication lines 14 and a monitoring device 11.

A network element 12 is for example an access node, for example a DSLAM, located in a network operator's premises (Central Office, Street Cabinet . . . ) and connected to one or more network element 13 by respective communication lines 14. A network element 13 is for example a modem or CPE located in customer premises.

A communication line 14 may be for example a twisted pair of wires. It is expected that a communication line 14 runs between a network element 12 and a network element 13, but there may be situations where the line starting from a network element 12 does not reach the expected network element 13, for example the cable is cut.

A network element 12 and a network element 13 may be configured for communicating over the corresponding communication line 14 based on DSL technology.

A network element 12 may be configured for performing SELT measurement on a communication line 14, for example for determining the echo response (UER and/or CER) of the communication line 14.

The monitoring device 11 is configured for obtaining measurement data from one or more network elements 12, representative of the echo responses of one of more communication lines 14, and for determining properties of the communication lines 14 based on the measurement data.

Figure 3:
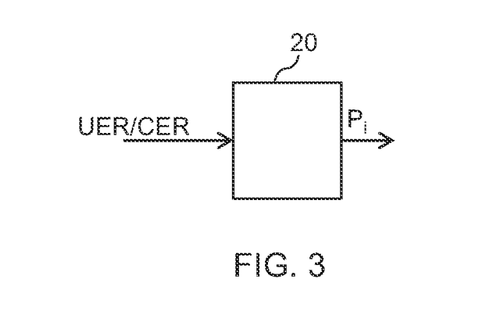
FIG. 3 is a block diagram of a processing module for monitoring a communication line.

More specifically, as illustrated on FIG. 3, the monitoring device 11 may process the echo response of a communication line 14 with a processing module 20 configured to determine properties $P_i$ of the communication line 14. The echo response may be the UER or the CER. The determined line properties $P_i$ may include one or more of the termination type (short, open, terminated), the line length, one or more cable properties (velocity, cable model types . . . ), the presence of impairments (for example expressed as one out of 3 categories: No impairment, one impairment, more than one impairments), the type of impairments (bridge tap, etc.), the location of impairments . . . . The processing module 20 may include one or more trained machine learning models, for example neural networks.

The monitoring device 11 may comprises one or more computers, for example a cloud-based server and/or a user device, e.g. a laptop computer.

Figure 4:
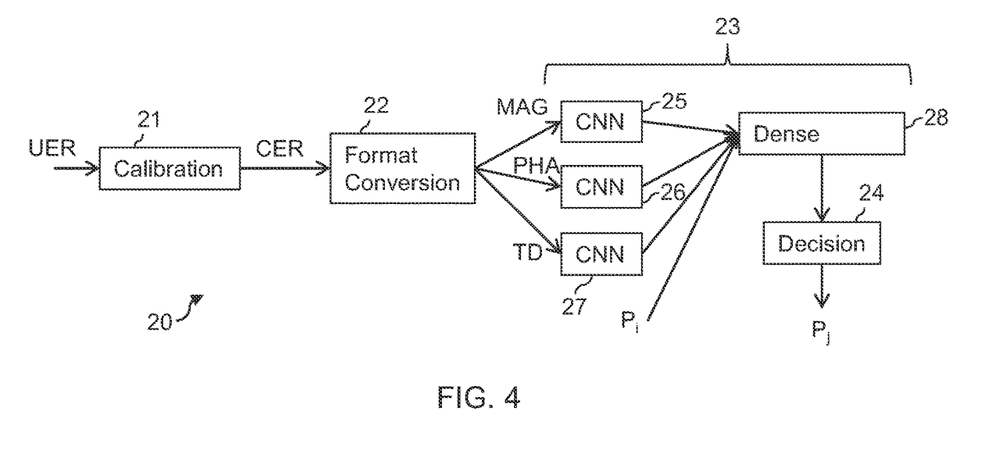
FIG. 4 is a block diagram of an example implementation of the processing module of FIG. 3.

FIG. 4 is a block diagram of an example implementation of the processing module 20. In this example, the processing module 20 comprises a calibration module 21, a format conversion module 22, a neural network 23 and decision module 24.

The calibration module 21 determines a calibrated echo response CER based on an uncalibrated echo response UER. Indeed, raw SELT-PMD measurements are, by nature, uncalibrated. In order to gain in accuracy (by compensating some parasitic hardware effects from the board and line driver), a calibration process is advised in order to transform the UERs into CERs. To handle this, some calibration data is used (either per port or per board calibration). For example, Broadband Forum TR-347 document is explaining a SELT calibration process. It comprises taking three different measurements (OPEN, SHORT, LOAD) at the board connection. With this, it's quite easy to transform and Uncalibrated Echo Response (UER) to a Calibrated Echo Response (CER) using the provided formula.

The format conversion module 22 determines magnitude data MAG, phase data PHA and time domain data TD based on the calibrated echo response CER. CERs are typically represented in a complex format, i.e. real and complex values for respective frequencies or tones. This representation can be transformed into another representation: frequency domain magnitudes and phases. A Time-Domain Reflectogram (TDR) can also be computed from the CER. Accordingly, the format conversion module 22 provide magnitude data MAG and phase data PHA specifying the echo response, and time-domain data TD associated with the echo response. The magnitude data MAG is for example a vector specifying the frequency-domain magnitude of the echo response for respective frequencies or tones, the phase data PHA is for example a vector specifying the frequency-domain phase of the echo response for respective frequencies or tones, and the time domain data is for example a vector specifying the time domain reflectogram of the line.

A Time-Domain Reflectogram (TDR) may be computed from the CER, which is defined as a vector with entries that are squared versions of the respective entries of the time domain calibrated echo response vector. The TDR can be further considered in linear scale or in dB scale.

The neural network 23 is configured for determining one or more output features based on the magnitude data MAG, phase data PHA and time-domain data TD provided by the format conversion module 23.

The neural network 23 comprises a convolutional branch 25 for processing the magnitude data MAG, a convolutional branch 26 for processing the phase data PHA, and a convolutional branch 27 for processing the time domain data TD. Each of the convolutional branches 25, 26 and 27 may comprises at least a convolutional layer for feature extraction. In some embodiments, each of the convolutional branches 25, 26 and 27 may comprises successively: a first convolutional layer with a plurality of 1D convolutional filters, a first pooling layer, a second convolutional layer with a plurality of 1D convolutional filters and a second pooling layer.

The neural network 23 comprises also a dense part 28 configured for processing the outputs of the convolutional branches 25, 26 and 27. The dense part 28 comprises for example a plurality of fully-connected layers, e.g. an input layer, one or more hidden layers and an output layer, wherein each neuron of a layer is connected with each neuron of the next layer. In some embodiments, the dense part 28 is not fully-connected, for example because sparsity has been introduced by a network compression technique.

The decision module 24 determines one or more properties $P_i$ of the line based on the output of the neural network 23. For example, when the neural network 23 performs a classification tasks and outputs probabilities for respective classes, the decision module 24 selects the class with the highest probability (argmax function).

In some embodiments, the processing module 20 comprises a plurality of processing chains for determining respective line properties $P_i$. For example, the processing module 20 comprises a first processing chain with a calibration module, a format conversion module, a neural network and a decision module for determining the line termination, and a second processing chain with a calibration module, a format conversion module, a neural network and a decision module for determining the line length.

In such a case, some parts may be shared among processing chains. For example, the calibration and format conversion module may be common to various processing chains.

Also, the line properties $P_j$ determined by a first processing chain may be used as input in another processing chain for determining one or more other line properties $P_i$. For example, the properties $P_j$ are provided as additional inputs to the dense part 28 of the neural network 23.

In an example implementation, the processing module 20 determines the line termination and the line length. For example, in a first processing chain, the neural network performs a classification task and outputs probabilities for the possible termination types Open, Short, Connected, and the decision module selects the termination type having the highest probability. Then, in a second processing chain, the line termination is used as input, for example as a one-hot encoded vector input to the dense part of the neural network. The neural network performs a regression task and outputs an estimated line length. The decision modules outputs for example the estimated line length and an error interval. The error interval may be determined based on predetermined rules determined empirically, depending on the line termination and/or extend of the frequency spectrum of the measured echo response.

Figure 5:
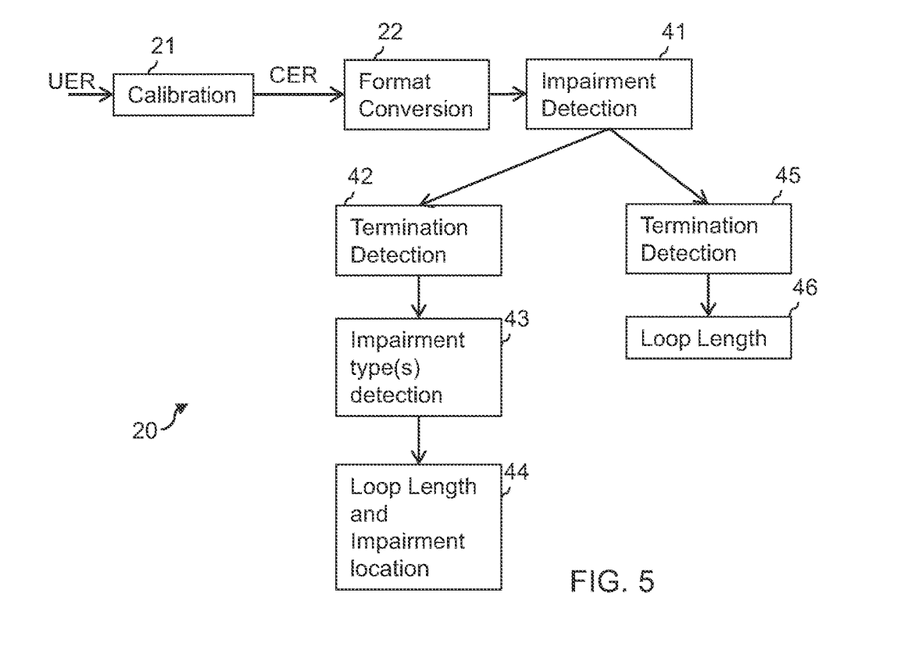
FIG. 5 is a block diagram of another example implementation of the processing module of FIG. 3.

FIG. 5 is a block diagram of another example implementation of the processing module 20. In this example, the processing module 20 comprises a calibration module 21, a format conversion module 22 as described above, and a plurality of detection modules 41 to 46.

More specifically, a detection module 41 determines the presence of impairments based on the magnitude data MAG, the phase data PHA and the time domain data TD. For example, the detection module 41 performs a classification task with three categories corresponding to "no impairment", "one impairment" and "more than one impairment".

The processing module 20 uses some of the detection modules 42 to 46, depending on the output of the detection module 41.

If the presence of one or more impairments is detected by the detection module 41, the detection modules 42 determines the line termination based on the magnitude data MAG, the phase data PHA and the time domain data TD. For example, the detection module 41 performs a classification task with three categories corresponding to "open", "short" and "load". Then, the detection modules 43 determines impairment types based on the magnitude data MAG, the phase data PHA and the time domain data TD and the detected termination. For example, the detection module 43 performs classification tasks with categories corresponding to potential impairments such as bridge tap, capacitive coupling . . . . Then, the detection modules 44 determines loop length and impairment location based on the magnitude data MAG, the phase data PHA and the time domain data TD, the detected termination and impairment types. For example, the detection module 44 performs regression tasks for the desired outputs.

If no impairment is detected by the detection module 41, the detection modules 45 determines the line termination based on the magnitude data MAG, the phase data PHA and the time domain data TD. For example, the detection module 45 performs a classification task with three categories corresponding to "open", "short" and "load". Then, the detection modules 46 determines loop length based on the magnitude data MAG, the phase data PHA, the time domain data TD and the detected termination. For example, the detection module 46 performs regression tasks for the desired outputs.

Any one of the detection modules 41 to 46 may comprises a neural network having the multi-branches architecture described in more details for the neural network 23 of FIG. 4.

In the example of FIG. 5, two detection modules may perform the same or similar task, for example the detection modules 42 and 45 detects the line termination. When training the neural networks, a part of the training set associated with impaired lines may be used for detection modules 42 to 44 and another part of the training set associated with impaired lines may be used for detection modules 45 and 46. Accordingly, the detection modules are specialized for impaired or non-impaired lines and this improves the detection performances.

In some cases, the monitoring device 11 does not perform calibration, for example when the echo response obtained by the monitoring device 11 is already a calibrated echo response. Accordingly, the calibration module 21 may not be necessary.

In some cases, the monitoring device 11 does not determine time domain data TD, for example when the accuracy of the line's properties determined based on the magnitude data MAG and phase data PHA is good enough. In such case, the convolutional branch 27 may not be necessary.

In some cases, the monitoring device 11 does not perform format conversion, for example when the echo response obtained by the monitoring device 11 is already specified in the frequency domain based on magnitude and phase, or when the performances of processing the echo response in the complex real/imaginary format are good enough. Accordingly, the format conversion module 22 may not be necessary. In the respective cases, the echo response is expressed in two dimensions and includes first dimension data (real data or magnitude data) and second dimension data (imaginary data or phase data), and the branches 25 and 26 process respectively the first dimension data and the second dimension data.

Figure 6:
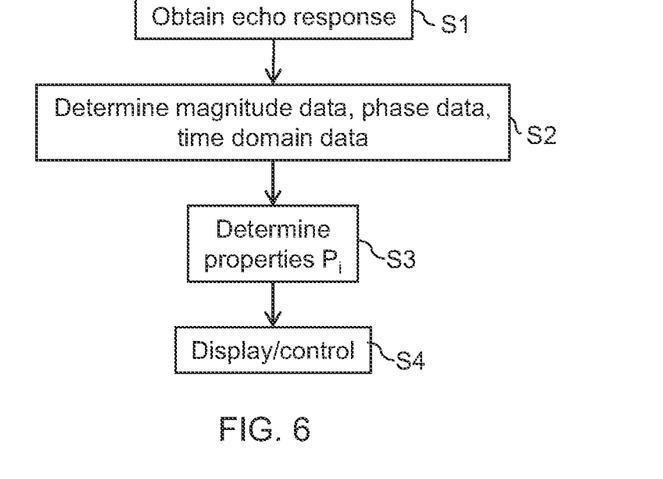
FIG. 6 is a flowchart of a method for monitoring a communication line.

FIG. 6 is a flowchart of a method executed by the monitoring device 11.

The monitoring device 11 obtains data specifying the echo response of one or more communication line 14 (Step S1). For example, a network element 12 performs SELT measurements of the echo responses of the connected communication lines 14 and sends the measurement data to the monitoring device 11. The received data may specify the uncalibrated or calibrated echo response and in the former, the monitoring device 11 may perform a calibration, e.g. with the calibration module 21.

The obtained data may specify the echo response as complex numbers, with real and imaginary parts. The monitoring device 11 thus determines the magnitude data MAG, phase data PHA and time domain data TD (Step S2). Details of this operation have been described in reference to the format conversion module 22.

Then, the monitoring device 11 determines one or more lines properties based on the magnitude data MAG, phase data PHA and time domain data TD (Step S3). As explained with reference to FIGS. 4 and 5, this involve processing the magnitude data MAG with the convolutional branch 25, the phase data PHA with the convolutional branch 26 and the time domain data TD with the convolutional branch 27. The outputs of the convolutional branches may be processed by the dense part 28 and decision module 24 to determine the desired line properties $P_i$.

In some embodiments, the monitoring device 11 determines one or more other lines properties based on the magnitude data MAG, phase data PHA and time domain data TD and on one or more of the previously determined line properties. This may involve cascading the determination of line properties $P_i$, for example as illustrated on FIG. 5.

Then, the monitoring device 11 uses the determined lines properties (Step S4).

For example:
- the monitoring device 11 controls the display of the determined line properties on a display. This informs a user of the technical state of the communication network 10.
- the monitoring device 11 controls the display of a recommended technical action to be performed on the communication network 10. For example, when the line termination type is Short, the monitoring device 11 recommends removing the short-circuit.
- the monitoring device 11 may store the determined line properties, e.g. in a log file or database.
- monitoring device 11 controls the communication network 10 to change its technical operation. For example, the monitoring device 11 changes one or more configuration parameters of the network element 12, which impact the performance of the communication line(s) 14.

The neural network 23 may be trained by supervised learning, based on a training set which specifies a plurality of echo responses and associated labels.

An echo response of the training set may be an UER or CER, and may be expressed as real/imaginary or magnitude/phase complex numbers. Depending on the type and format of the echo response, training may involve calibration and/or format conversion.

One or more labels are associated with each echo response of the training set. A label specifies one or more line properties. For example, a label specifies the termination type, encoded as a one-hot vector. Another label specifies the line length. Another label specifies the type of the cable.

A combination of classical backpropagation technique to compute derivatives and gradient descent type of algorithm may be used to train such DCNN. An example of gradient descent type of algorithm is Adaptive Momentum gradient descent approach (ADAM). These techniques typically consider the root mean square error (RMSE) between the current prediction and the target to improve the neural network model weights.

The training set may be obtained based on measuring the echo responses of lines with known properties, data augmentation techniques and/or by using a generative approach. The generative approach may comprises determining the echo responses of lines based on circuit simulation, for a plurality of modeled lines with know properties. The plurality of modeled lines may be obtained by selecting values for the parameters for a parametric line model. In some embodiments, the values of the parameters are selected based on one or more distributions which reflects distributions associated with a set of real lines.

Training the machine learning model may also involve determining an appropriate value for hyperparameters, for example the size and number of filters for the convolutional layers. In some embodiments, hyperparameters tuning comprises a domain-aware genetical optimization approach. Indeed, instead of setting by expertise only some specific DCNN topologies or, by contrast, to perform a random grid search within larger set of values combinations, some embodiments are implementing a hybrid solution, taking advantage of both approaches. In those embodiments, a larger set of domain-valid combinations of hyper-parameters are proposed. Then, the training process searches, using for instance a genetical optimization process, for the best combinations among those. The advantage of such optimization process is that it converges towards an optimized combination of hyper-parameters, however valid from a domain and data science perspective (i.e. suitable for the types of patterns present in the U/CERs curves).

The training process may be performed by the monitoring device 11. Alternatively, the monitoring device 11 obtained the trained machine learning model from another apparatus.

The monitoring device 11 uses a machine learning approach for determining properties of a communication line 14 based on a measured echo response. This is an efficient approach to determine line properties in a reliable and accurate manner. The approach is not limited to any DSL technology or spectrum, and can be applied for example to G.(mg)fast spectrum. Moreover, the performances of the determination may be linked to the architecture of the neural network and/or to the scope and content of the training set.

For example, the machine learning approach uses a convolutional neural network (deep learning). It has been found that a convolutional approach allows to identify patterns appearing in the echo response and the repetition of patterns, which improve the performances of the classification or regression task, for example the accuracy.

Also, expressing the echo response in the magnitude and phase format in the frequency domain, and processing the magnitude data and phase data separately with respective convolutional branches, has been found to provide better performances in comparison to considering a single convolutional layer for processing both the magnitude and phase.

Similarly, using also the time domain reflectogram and processing it with a separate convolutional branch has been found to improve the performances.

When more than one properties are to be determined, determining a first line property and using it as input for determining a second line property has been found to improve performance. For example, using the termination type as input improve the accuracy and error interval of the length determination.

Also, using a generative approach for obtaining the training set allows to control its content and scope to provide the desired performances.

Figure 7:
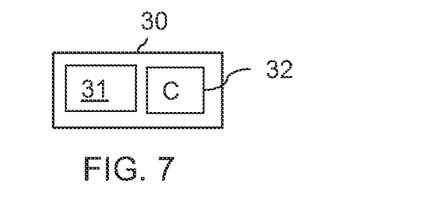
FIG. 7 is a block diagram of an apparatus for monitoring a communication line.

FIG. 7 is a block diagram of an apparatus 30, for example implementing the monitoring device 11. The apparatus 30 comprises at least a processor 31 and a memory 32. The memory 32 stores computer program code C. The memory 32 and the computer program code C are configured for causing, with the processor 31, the apparatus 30 to perform, at least in part, the method of FIG. 6.

In the context of this description, a machine learning model is a function for outputting an output based on an input, which depends on trainable parameters. An example of machine learning model is a neural network, with weights and biases as parameters. Training the machine learning model is the task of determining the parameters of the model based on training data.

It should be noted that although examples of methods have been described with a specific order of steps, this does not exclude other implementations. In particular, the described steps may be executed in another order, partially or totally in parallel . . . .

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represent various processes which may be substantially represented in computer readable medium and so executed by a computer or processor, whether or not such computer or processor is explicitly shown.

While the principles of the invention have been described above in connection with specific embodiments, it is to be clearly understood that this description is made only by way of example and not as a limitation on the scope of the invention, as defined in the appended claims.

The invention claimed is:

1. An apparatus comprising at least one processor and at least one memory storing computer program code, the memory and the computer program code being configured to cause, with the processor, the apparatus to:
   obtain echo response data representative of the echo response of a communication line, wherein the echo response data specifies the echo response based on two dimensions, the two dimensions include a first dimension data including real data or magnitude data and a second dimension data including imaginary data or phase data,
   determine at least one property of the communication line based on processing the echo response data with a neural network, wherein the neural network comprises at least:
      a first convolutional branch for processing the first dimension data,
      a second convolutional branch for processing the second dimension data,
      a dense part for processing outputs of the first and second convolutional branches.

2. The apparatus according to claim 1, wherein the first dimension data comprise magnitude data and the second dimension data comprise phase data or wherein the first dimension data comprise real part data and the second dimension data comprise imaginary part data.

3. The apparatus according to claim 1, wherein the first dimension data comprise magnitude data and the second dimension data comprise phase data, and wherein obtaining echo response data comprises receiving measurement data wherein the echo response is specified in a complex format comprising real part and imaginary part, and determining the magnitude data and phase data based on the echo response.

4. Apparatus according to claim 1, wherein the memory and the computer program code are further configured to cause, with the processor, the apparatus to: determine time domain data specifying a time domain reflectogram based on the echo response, wherein the neural network comprises a third convolutional branch for processing the time domain data and wherein the dense part is configured for processing output of the third convolutional branch.

5. The apparatus according to claim 1, wherein the echo response data specifies an uncalibrated echo response, and the memory and the computer program code are configured to cause, with the processor, the apparatus to: determine a calibrated echo response based on the uncalibrated echo response and calibration data.

6. The apparatus according to claim 1, wherein the memory and the computer program code are configured to cause, with the processor, the apparatus to:
   determine at least one other property of the communication line based on processing the echo response data with another neural network, wherein the other neural network comprises at least:
      a fourth convolutional branch for processing first dimension data,
      a fifth convolutional branch for processing the second dimension data,
      another dense part for processing outputs of the fourth and fifth convolutional branches and said at least one property.

7. The apparatus according to claim 1, wherein said at least one property include at least one of a line termination, a line length, a type of a cable, a presence of impairment, a type of impairment, a location of impairment.

8. The apparatus according to claim 6, wherein said at least one property include a line termination and said at least one other property include a line length.

9. The apparatus according to claim 1, wherein the memory and the computer program code are configured to cause, with the processor, the apparatus to: control a display based on the determined at least one property and/or configure a network element associated with the communication line based on the determined at least one property.

10. The apparatus according to claim 1, wherein the memory and the computer program code are configured to cause, with the processor, the apparatus to: determine a training set based on generating echo response of modelled communication lines with a circuit simulator, and training the neural network based on the training set.

11. A computer-implemented method for monitoring a communication line, comprising:
   obtaining echo response data representative of the echo response of a communication line, wherein the echo response data specifies the echo response based on two dimensions, the two dimensions include a first dimension data including read data or magnitude data and a second dimension data including imaginary data or phase data,
   determining at least one property of the communication line based on processing the echo response data with a neural network, wherein the neural network comprises at least:
      a first convolutional branch for processing the first dimension data,
      a second convolutional branch for processing the second dimension data,
      a dense part for processing outputs of the first and second convolutional branches.

12. The method according to claim 11, wherein the first dimension data comprise magnitude data and the second dimension data comprise phase data or wherein the first dimension data comprise real part data and the second dimension data comprise imaginary part data.

13. The method according to claim 11, comprising determining time domain data specifying a time domain reflectogram based on the echo response, wherein the neural network comprises a third convolutional branch for processing the time domain data and wherein the dense part is configured for processing the output of the third convolutional branch.

14. The method according to claim 11, comprising determining a training set based on generating echo response of modelled communication lines with a circuit simulator, and training the neural network based on the training set.

15. A non-transitory computer readable medium storing a computer program comprising instructions for causing a computer to:
   obtain echo response data representative of the echo response of a communication line, wherein the echo response data specifies the echo response based on two dimensions, the two dimensions include a first dimension data including real data or magnitude data and a second dimension data, including imaginary data or phase data, determine at least one property of the communication line based on processing the echo response data with a neural network, wherein the neural network comprises at least:
a first convolutional branch for processing the first dimension data,
a second convolutional branch for processing the second dimension data,
a dense part for processing outputs of the first and second convolutional branches.

\* \* \* \* \*

UNITED STATES PATENT AND TRADEMARK OFFICE
CERTIFICATE OF CORRECTION

PATENT NO. : 11,909,908 B2
APPLICATION NO. : 17/142377
DATED : February 20, 2024
INVENTOR(S) : Nicolas Dupuis et al.

It is certified that error appears in the above-identified patent and that said Letters Patent is hereby corrected as shown below:

In the Claims

Column 12, Lines 21-40 Claim 11, should read:
11. A computer-implemented method for monitoring a communication line, comprising:
obtaining echo response data representative of the echo response of a communication line, wherein the echo response data specifies the echo response based on two dimensions, the two dimensions include a first dimension data including real data or magnitude data and a second dimension data including imaginary data or phase data,
determining at least one property of the communication line based on processing the echo response data with a neural network, wherein the neural network comprises at least:
  a first convolutional branch for processing the first dimension data,
  a second convolutional branch for processing the second dimension data,
  a dense part for processing outputs of the first and second convolutional branches.

Signed and Sealed this
Twenty-sixth Day of March, 2024

Katherine Kelly Vidal
*Director of the United States Patent and Trademark Office*